UNITED STATES PATENT OFFICE.

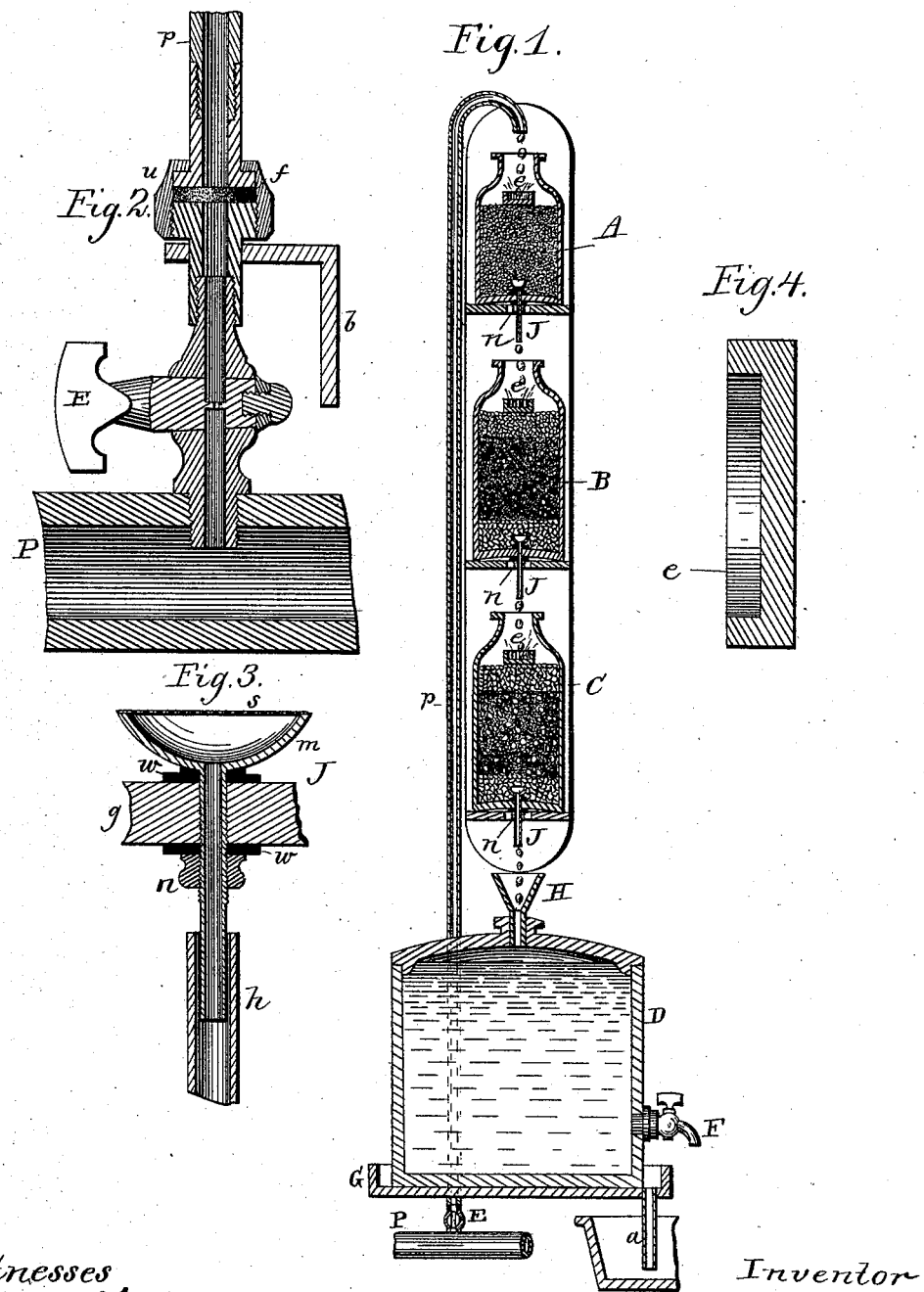

ALBERT C. NEWCOMB, OF SPRINGFIELD, MASSACHUSETTS, ASSIGNOR OF ONE-HALF TO STEPHEN W. BOWLES, OF SAME PLACE.

FILTERING AND CLARIFYING WATER.

SPECIFICATION forming part of Letters Patent No. 412,408, dated October 8, 1889.

Application filed December 3, 1887. Serial No. 256,944. (No model.)

*To all whom it may concern:*

Be it known that I, ALBERT C. NEWCOMB, of the city of Springfield, county of Hampden, State of Massachusetts, have invented Improvements in Filtering and Clarifying Water, of which the following is a specification.

My invention consists, primarily, in filtering, aerating, deodorizing, and clarifying water by dripping the water through one or more air-spaces, passing the water through a layer or layers of material for filtering the water and for absorbing the gases contained therein, whereby the water is aerated, deodorized, and clarified, and the solid matter extracted therefrom, substantially as hereinafter described.

My invention further consists in certain combinations and subcombinations to be hereinafter described.

In the accompanying drawings, Figure 1 is a view in cross-section of an apparatus for carrying out my invention. Figs. 2, 3, and 4 are details of parts of the apparatus shown in Fig. 1.

Fig. 1 represents three glass jars or receptacles A, B, and C, arranged one above the other upon shelves which are attached or secured to the wall of a room. The jars A, B, and C are preferably provided with wide mouths and are uncovered, and each of said jars has an eduction-pipe J for the passage of the water from one to the other and to the tank or water-cooler D. The upper jar of the series A is filled or partly filled with granulated quartz, the jars B and C being partly filled with successive layers of granulated quartz and granulated quartz and powdered charcoal mixed together. I preferably place a thin layer of granulated quartz beneath the layer, composed of quartz and charcoal intermixed together, for the purpose of protecting the strainer S of the eduction-pipe J, which would otherwise be clogged by the powdered charcoal, the layer of quartz placed over the intermixed charcoal and quartz being about an inch in depth and serving the purpose of preventing the powdered charcoal from floating when the water enters the receptacle. The granulated quartz intermixed with the charcoal is in the proportion of about one-fourth quartz by volume. The water from the pipe P enters pipe *p* through cock E, so as to drip into the jar A, where it may be spattered by striking into the dish-like plate *c*, and thus be still further exposed to the air. The water after being thus dripped and exposed to the air percolates through the granulated quartz and passes through the strainer S, of wire-cloth or like material, stretched over the bowl *m* of the eduction-pipe J, (shown in Fig. 3,) and again drips into the jar beneath upon a plate *e* and percolates through the successive layers of quartz and of quartz mixed with charcoal, which not only filters any remaining solid matter which may be floating in the water but by the property which charcoal possesses when properly prepared the odors and gases in solution in the water are removed, and the coloring-matter in the water, if due to vegetable discolorations, is destroyed by the progress of the water through the air and through the successive layers of quartz and charcoal, and the water passes into the tank D refiltered, reaerated, and reclarified.

The contents of jar C are substantially like that in jar B; but advantages are gained by reclarifying the water by the employment of the jar C when the water acted upon is heavily ladened with odors, gases, and discolorations. On the other hand, the desired result may be reached with a single jar having successive layers of quartz, and charcoal and quartz, with the water aerated as it enters and leaves the jar, if the water acted upon is but slightly contaminated.

I make use of granulated quartz in preference to sand because the fracture leaves an uneven surface on each granule for the lodgment of impurities, and yet allows the water to percolate through the mass in a desirable manner, and when the granular quartz is mixed with powdered charcoal serves an excellent purpose in facilitating percolation and in exposing the water to the action of the charcoal. The charcoal which I prefer to use is formed by charring wood or sawdust in a a closed retort by subjecting it to a degree of heat not reached in charcoal-pits. The quality of the charcoal thus made is such that it absorbs odors and gases more readily and in a larger volume; but I may use other material than quartz and charcoal without departing from my invention.

In Fig. 1 the water is shown as dripping from the jar C through an air-space into a water tank or cooler D, provided with a loose-fitting cover, so that when the cooler has filled it will run over and down the outside surface, and by evaporation tend to cool the contents of the said tank, the portion that overflows and is not evaporated passing off at the spout $a$ of the tray G. The water is shown as entering the tank D through a tunnel-shaped induction-opening; but the pipe J might enter through a hole in the cover or set loosely into a tube secured in the cover, as at $h$, Fig. 3, care being taken to allow space for the circulation of the air between the tube $h$ and the pipe J. To prevent gurgling, a cock F is provided for drawing water from tank D.

Referring to Fig. 2, there is shown the preferred form of cock E, for controlling the supply of water to the apparatus. The said cock is arranged to completely revolve on its longitudinal axis, and is provided with a small orifice, of the one-hundredth of an inch in some instances, where heavy pressures are met with. This orifice is enlarged at the circumference, and the enlargements are better if not tapered. This construction results in an ajutage that insures a drip, which is essential to the perfect operation of the apparatus. By this arrangement the cock can be used to open and close the water-way from the supply to the apparatus, and if the orifice becomes clogged the cock can be turned, so that the water will enter from an opposite side, and in flowing therethrough clear out the orifice, which will be more effectually done if the orifice is not tapered. The cock E as ordinarily used is screwed into pipe P by its screw-threaded portion, and also into a union U, into which pipe $p$ also screws in the union U. I insert a washer, of felt or like material, to strain the water in its progress to the jars A, B, and C, to exclude the entrance of the coarser portion of the solid matter into the jars, as the felt can more readily be removed and replaced by new as compared with cleansing the contents of the jars, or either of them.

To facilitate the disconnecting and connecting of the union U, the lower part of the union is securely held in a bracket $b$, that is rigidly screwed or fastened to the wall or other support. This prevents the displacement of the cock E in the operation of disconnecting the union U.

Referring to Fig. 3, the eduction-pipe J is shown as passing through the bottom of a glass jar, a leakage of the joint thus made being prevented by the washers $w\ w$, of rubber or other yielding material, forced to the upper and under surface of the glass by the nut $n$.

Having described my invention, what I claim is—

1. The combination, with a jar or receptacle provided with an eduction pipe or outlet, of an induction-pipe comprising a water-passage and a transverse diaphragm in such passage, each side of which is a plane surface at right angles to the walls of passage, said diaphragm having a fine central perforation, substantially as described.

2. In an apparatus for filtering and clarifying water, the combination, with a jar or jars containing a material for filtering, clarifying, and deodorizing the water, of a water-supply pipe and a valve therein provided with a water-passage and a transverse diaphragm in such passage, each side of which is a plane surface at right angles to the walls of passage, said diaphragm having a fine central perforation, substantially as described.

ALBERT C. NEWCOMB.

Witnesses:
J. B. KING,
J. W. BUELL.